United States Patent [19]

Harrison

[11] Patent Number: 5,407,222
[45] Date of Patent: Apr. 18, 1995

[54] BICYCLE GUIDANCE DEVICE

[75] Inventor: James A. Harrison, Tequesta, Fla.

[73] Assignee: In Venture Plus, Inc., Lake Worth, Fla.

[21] Appl. No.: 188,475

[22] Filed: Jan. 28, 1994

[51] Int. Cl.6 .............................................. B62H 1/10
[52] U.S. Cl. .................................. 280/293; 280/304.5
[58] Field of Search .................... 280/288.4, 293, 304.5

[56] References Cited

U.S. PATENT DOCUMENTS

| 3,650,544 | 3/1972 | Cassell | 280/293 |
|---|---|---|---|
| 4,730,840 | 3/1988 | Goldmeir | 280/210 |
| 4,903,975 | 2/1990 | Weisbrodt et al. | 280/293 |
| 4,917,398 | 4/1990 | de Miranda Pinto | 280/293 |
| 5,154,096 | 10/1992 | Geller et al. | 280/293 |
| 5,242,183 | 9/1993 | Oberg et al. | 280/293 |
| 5,259,638 | 11/1993 | Krauss et al. | 280/293 |
| 5,303,944 | 4/1994 | Kalmus | 280/293 |

FOREIGN PATENT DOCUMENTS

| 2512767 | 3/1983 | France | 280/293 |
|---|---|---|---|
| 2600963 | 1/1988 | France | 280/293 |
| 2668744 | 5/1992 | France | 280/288.4 |
| 817089 | 8/1951 | Germany | 280/293 |
| 2830561 | 1/1980 | Germany | 280/293 |
| 2238282 | 5/1991 | United Kingdom | 280/288.4 |

Primary Examiner—Kenneth R. Rice
Assistant Examiner—Kevin Hurley
Attorney, Agent, or Firm—Quarles & Brady

[57] ABSTRACT

A bicycle guidance device has a handle and at least one extension for positioning the handle above and behind the seat of the bicycle. The extension preferably attaches to the bicycle in the vicinity of the rear axle, and can be pivotally engaged to the axle bolt. A pivotal positioning member is pivotally connected to the bicycle in the vicinity of the seat support, and is operatively and slidably connected to at least one of the extensions to permit the securement of the handle in a desired position. A method for teaching bicycle riding is also disclosed.

9 Claims, 5 Drawing Sheets 5,407,222

BICYCLE GUIDANCE DEVICE

BACKGROUND OF THE INVENTION

1. Field of the Invention

This invention relates generally to bicycle training apparatus, and more particularly to bicycle guidance apparatus.

2. Description of the Relevant Art

Learning to ride a bicycle requires the young rider to learn simultaneously to balance and steer the bicycle. It is common for adults to steady the child by placing a hand on the bicycle. This requires the adult to walk in a stooped or bent-over posture. This posture is tiresome, and it is difficult to stay with the child as the speed of the bicycle increases. Also, it is difficult to properly balance the bicycle because the parent is generally behind the bicycle and does not have the advantage of leverage in applying force to guide and steady the bicycle.

A number of devices have been created for guiding bicycles. Generally, these devices include a handle that is fixed to a rear portion of the bicycle, as at the axle bolt, and can also be attached elsewhere to the bicycle for additional stability. Such devices have a number of improvements, such as Weisbrodt, et al., U.S. Pat. No. 4,903,975, with an adjustable handle; Geller et al., U.S. Pat. No. 5,154,096, with a brake; Cassell, U.S. Pat. No. 3,650,544, with a stabilizer mast and a hand-held loop member for engaging the stabilizer mast; de Miranda Pinto, U.S. Pat. No. 4,917,398, with a telescoping frame support and stops attached to the frame and the bicycle to limit the range of motion; and Goldmeier, U.S. Pat. No. 4,730,830, with a U-shaped push bar.

There remains a need for a bicycle guidance device with a handle that is pivotally positionable at virtually any location within a range of motion, yet can be firmly secured in the desired position. It is further desirable to provide such a device that is easily installed and easily adjusted upon installation, and that can fit any size bicycle without assembly.

SUMMARY OF THE INVENTION

It is an object of the invention to provide a bicycle guidance device with a handle that is pivotally adjustable relative to the bicycle.

It is another object of the invention to provide a bicycle guidance device that is easily installed.

It is still another object of the invention to provide a bicycle guidance device that is easily adjustable.

It is still another object of the invention to provide a bicycle guidance device that can be adapted for use on a variety of different bicycles.

It is still another object of the invention to provide a bicycle guidance device that is fully adjustable within the pivotal range of motion.

These and other objects are accomplished by a bicycle guidance device having a handle and at least one extension for attachment of the handle to the bicycle. The extension is attached to the bicycle in the vicinity of the rear axle and dimensioned to position the handle above and behind the seat of the bicycle. A pivotal positioning member is slidably connected to the extension and pivotally connected to the bicycle in the vicinity of the seat support. Structure is provided to secure the pivotal positioning member to the extension at a desired position.

Two extensions are preferably formed with the handle to provide a substantially inverted U-shaped construction. Portions distal to the handle have openings for positioning the extensions on the rear axle bolts, and the extensions can be secured to the bolts by resecuring nuts onto the bolts.

The structure for slidably securing the pivotal positioning member to at least one of the extensions preferably includes a channel member adapted to slidably receive the pivotal positioning member, and frictional engagement structure for securing the pivotal positioning member to the channel member. The channel member is preferably located on a support fixed between the two extensions. The channel member can have a second channel for receiving the support member such that the channel member will pivot about the support member, and will also be slidable over the support member.

BRIEF DESCRIPTION OF THE DRAWINGS

There are shown in the drawings embodiments which are presently preferred, it being understood that the invention is not limited to the precise arrangements and instrumentalities shown, wherein.

DETAILED DESCRIPTION OF THE PREFERRED EMBODIMENTS

Figure 1:
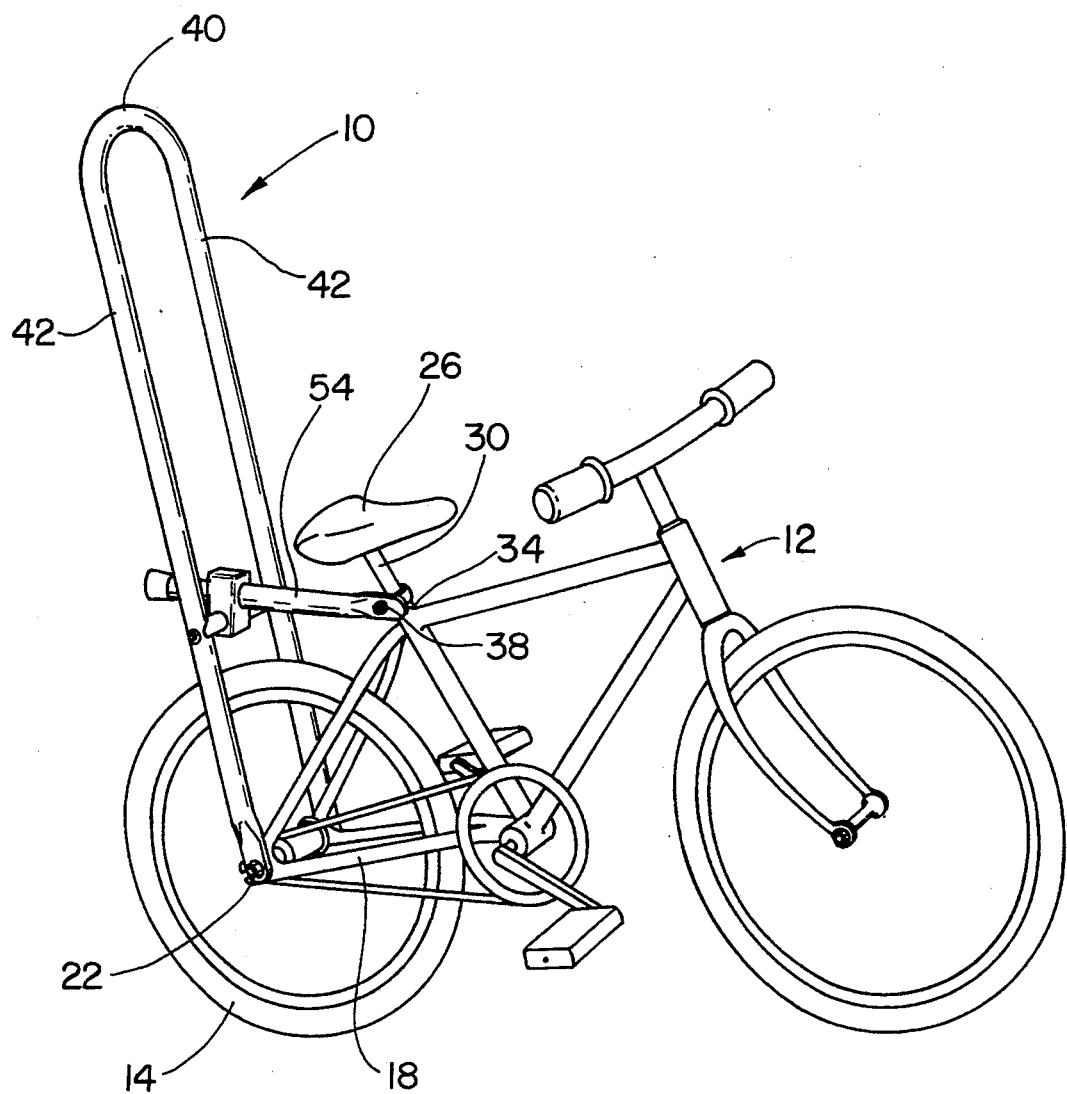
FIG. 1 is a perspective view of a bicycle guidance device according the invention as installed on a bicycle.

A bicycle guidance device 10 according to the invention is shown installed on a bicycle 12 in FIG. 1. The bicycle 12 can be of any design, and particularly those more appropriate to young children. The bicycle 12 typically has a rear wheel 14 that is mounted to a bicycle frame 18 by an axle bolt 22. A nut or other suitable fastener is used to secure the axle bolt to the frame 18. A seat 26 is supported by a seat post 30 that fits into a seat support section 34 of the frame 18. A seat adjustment bolt 38 is typically provided to secure the seat post 30 at a desired height and position.

The bicycle guidance device comprises a handle portion 40 and at least one extension 42 for positioning the handle above and behind the seat 30. In the preferred embodiment, the guidance device is provided as a substantially U-shaped member with a handle 40 provide at the bend and extensions 42 extending downwardly to the bicycle 12.

Figure 2:
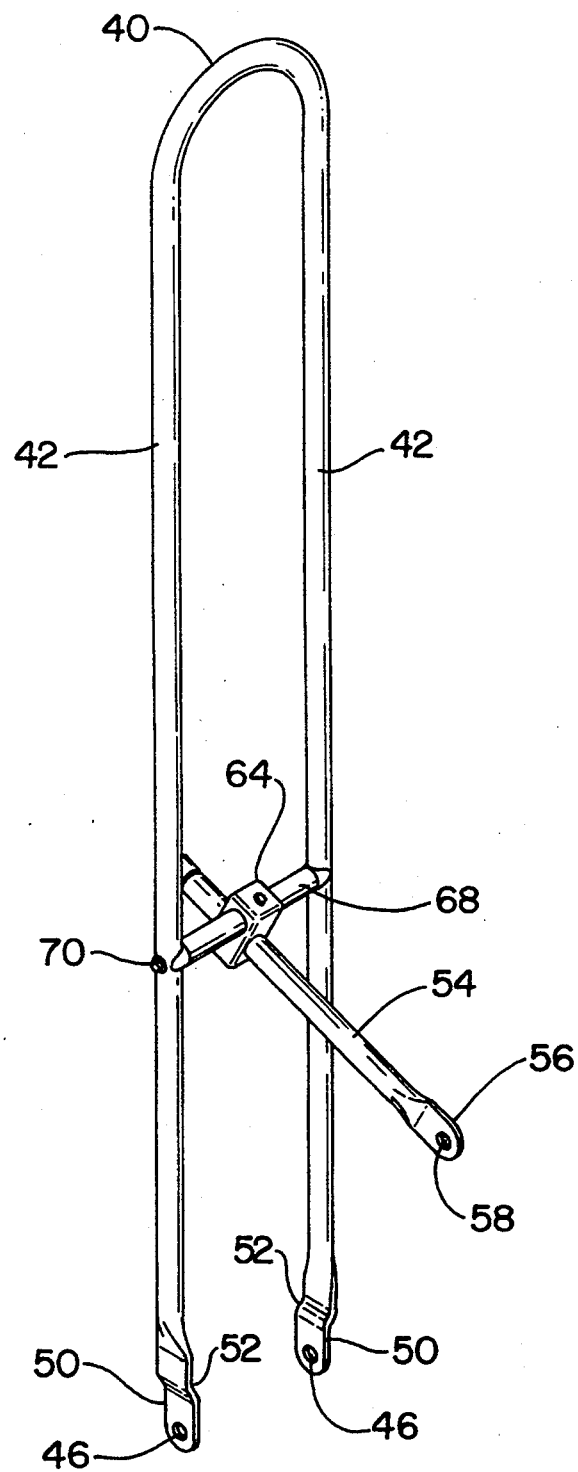
FIG. 2 is an enlarged perspective of the bicycle guidance device of the invention.
Figure 3:
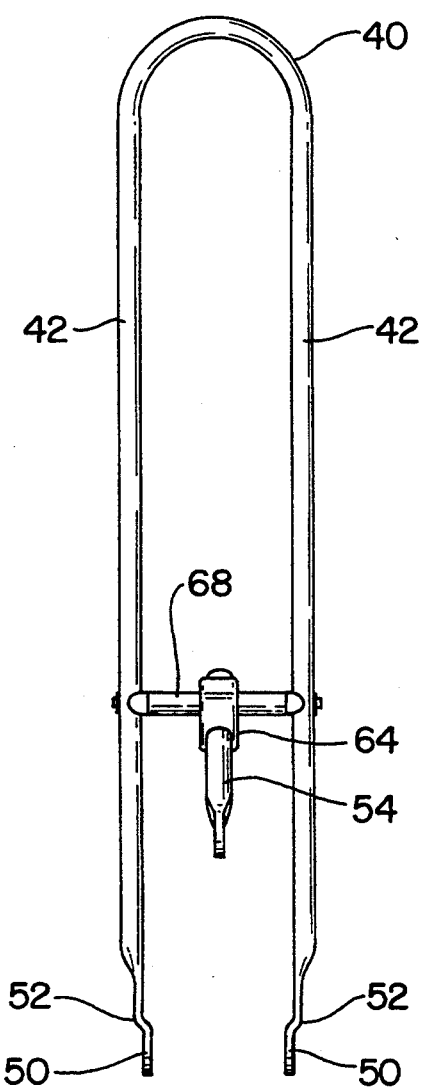
FIG. 3 is a front view.
Figure 4:
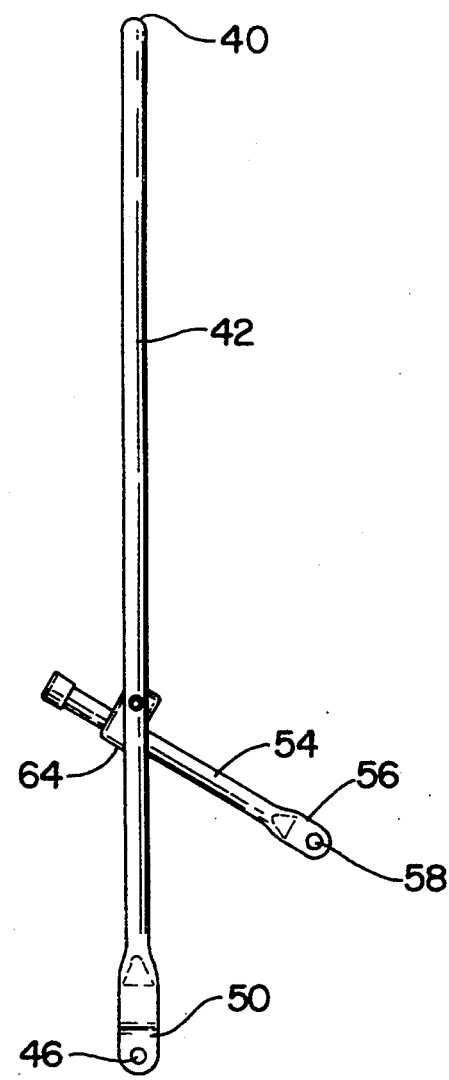
FIG. 4 is a side elevation.
Figure 5:
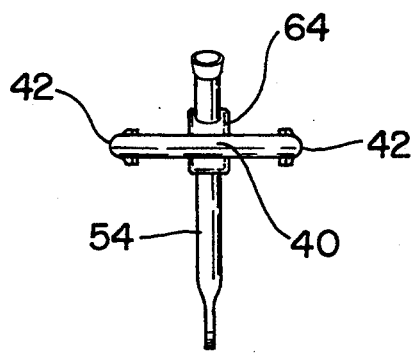
FIG. 5 is a top plan view.
Figure 6:
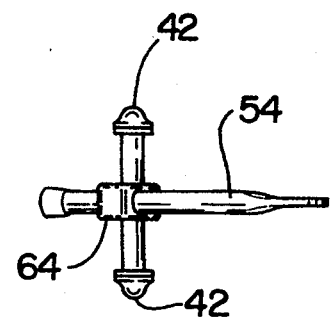
FIG. 6 is a bottom view.

The extensions 42 can be secured to the bicycle by a variety of constructions. The axle bolts 22 provide a convenient point of attachment. Openings 46 can be provided at ends 50 of the extensions 42 that are distal to the handle 40 (FIG. 2). The ends 50 can be set off inwardly by bends 52 to permit proper attachment to the axle bolt 22.

A pivotal positioning member is provided to secure the extensions 42 and handle 40 in a desired pivotal position. The pivotal positioning member is preferably in the form of an elongated member 54. The pivotal positioning member 54 is attached at one end to the bicycle in the vicinity of the seat support section 34. The vicinity of the seat support is defined to be frame members including or behind the seat support and above the rear axle, frame members extending to or near the seat support, and any fasteners or connectors at or near the seat support. In a preferred embodiment, an end 56 of the pivotal positioning member is provided with an opening 58 which fits onto the adjustment bolt 38 of the seat support, where it can be secured in place by a nut or other suitable fastener. The pivotal positioning member 54 should pivot about its point of attachment to the bicycle 12.

The pivotal positioning member is secured at an opposite end to at least one of the extensions 42. The pivotal positioning member 54 is slidably secured such that it can move past the extension 42, to permit the extension 42 and handle 40 to pivot relative to the bicycle. A variety of slidable engagement structures are possible, however, frictional engagement structures such as the set screw 60 are preferred because they permit the pivotal positioning member 54 to be secured at any sliding position relative to the extension 42. Alternative frictional engagement structure, such as collars with band-type tightening apparatus, clamps, or the like, could also be suitable.

It is preferred that an engagement member 64 be provided to secure and receive the pivotal positioning member 54. Where the pivotal positioning member is tubular, the engagement member 64 will preferably have a channel adapted to slidably receive the pivotal positioning member 54. The set screw 60, or other similar structure, extends through a suitable threaded opening in the engagement member 64 to provide for frictional engagement of the pivotal positioning member 54.

Figure 7:
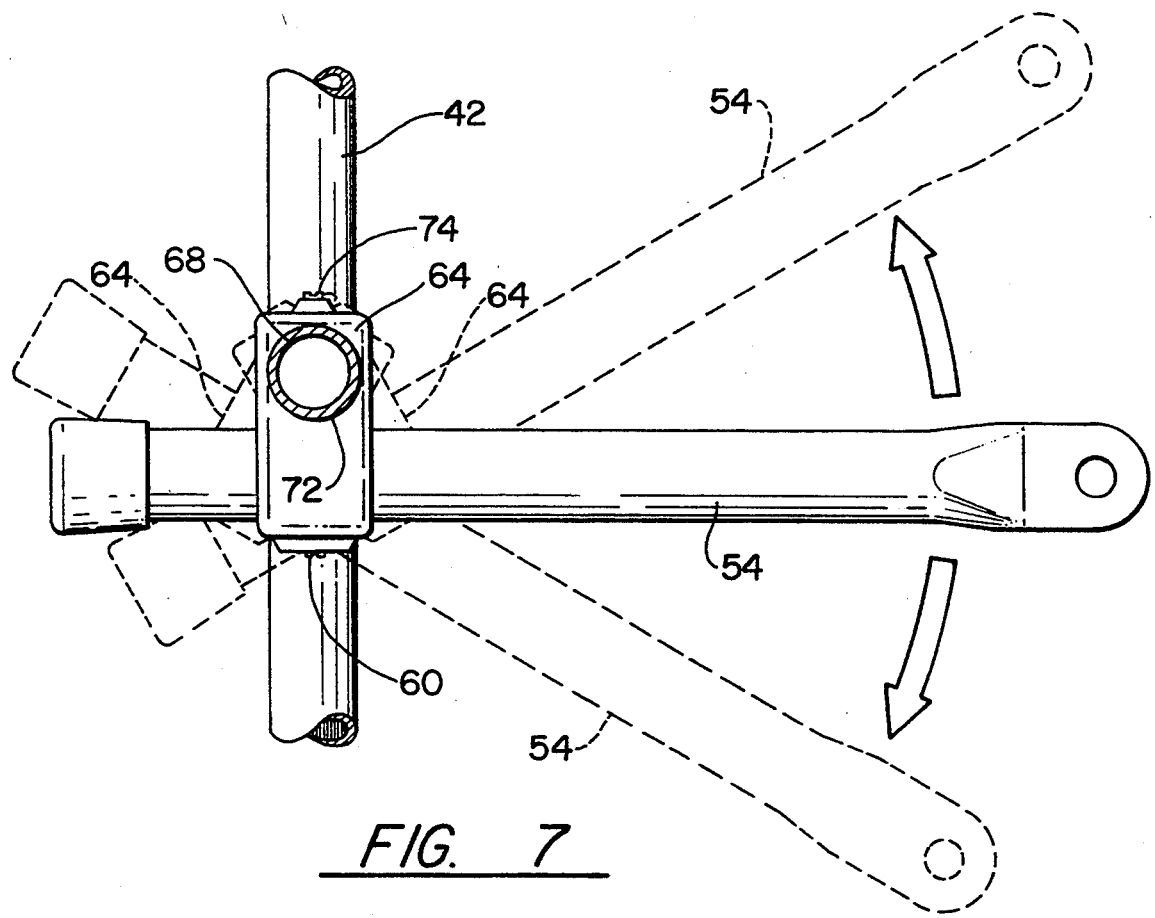
FIG. 7 is a side elevation, partially in cross section and broken away, and partially in phantom, demonstrating the pivoting attachment of the pivotal positioning member to the extensions.
Figure 8:
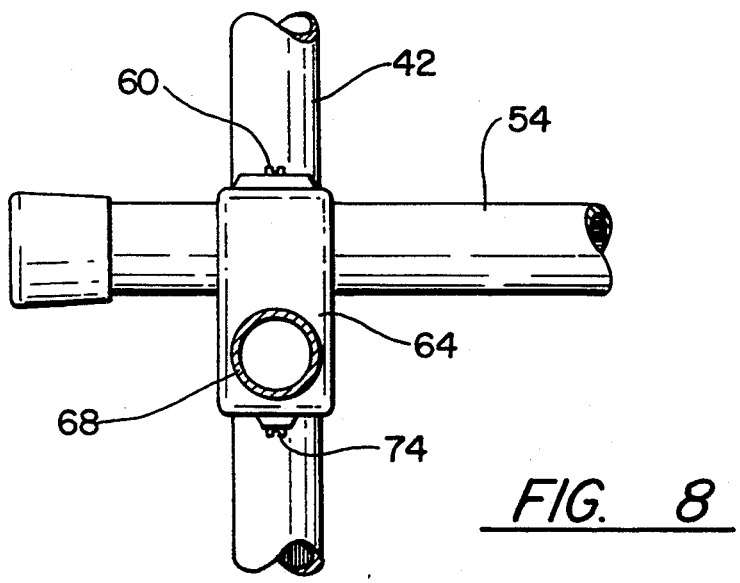
FIG. 8 is a side elevation, partially in cross section and broken away, of a channel member according to the invention.

The engagement member 64 can be secured to one or more of the extensions 42 in any suitable fashion, and can be directly fixed to one of the extensions 42. It is currently preferred, particularly where there are two extensions 42, that the engagement member 64 be mounted on a support member 68 which is fixed between the extensions 42, and is secured by suitable structure such as screws 70. A channel 72 can be provided in the fixture 64 for receiving the support member 68. The engagement member 64 can thereby pivot about the support member 68 in the manner depicted in FIG. 7. A set screw 74 can be utilized to secure the pivot position of the engagement member 64 on the support member 68. It is also possible to substantially invert the engagement member 64, as shown in FIG. 8, to provide an even greater range of motion, particularly for larger bicycles.

Figure 9:
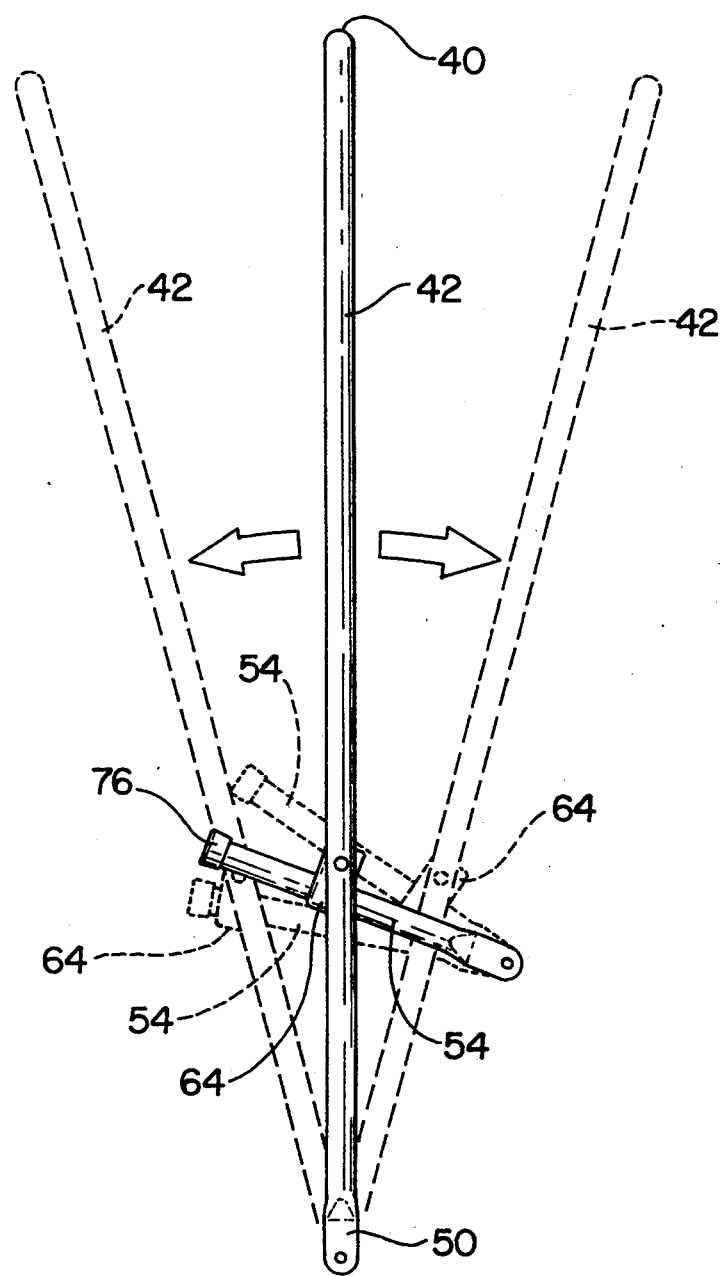
FIG. 9 is a side elevation, partially in phantom, illustrating the pivotal positioning of the invention.

The foregoing construction permits the handle 40 to be secured at virtually any position within the pivotal range of motion, as shown in FIG. 9. The engagement member 64 will pivot about the support member 68, and the pivotal positioning member 54 will slide relative to the extensions 42, such that the handle 40 can be secured at any relative position within the range of motion by simply tightening the set screws 60 and 74.

The handle 40 and extensions 42 can be formed from tubular material such as polyvinylchloride tubing or the like, and the ends 50 and curved portions 52 can be formed from flattened sections of such tubing. The handle 40 can include padding or reflective material for easy viewing by automobile drivers. The pivotal positioning member can likewise be tubular, and a cap 76 can be provided to cover the end. The engagement member 64 can be provided as a block which has transverse channels for receiving the pivotal positioning member 54 and the support member 68.

The guidance device of the invention is easily installed. The ends 50 are secured to the bicycle frame in the vicinity of the axle, and preferably by placing the axle bolts through the openings 58, and resecuring the nuts. The end 56 of the pivotal positioning member 54 is positioned in the vicinity of the seat support 34, and for the opening 58 to be placed over the seat adjustment bolt 38, whereupon a nut can be threaded onto the seat adjustment bolt 38 to secure the pivotal positioning member 54 in place. The engagement member 64 is slidable over the support member 68 because of the channel 72 formed in the engagement member 64. This has an advantage during installation, because the slidable nature of the engagement member 64 will permit movement over the support member 68 to account for variances in the positioning of the seat adjustment bolt 38 that can change with the size and style of bicycle.

In operation, the adult walks behind the bicycle with the hand on the handle 40 as the child attempts to ride. The bicycle and child can easily be supported by the adult because of the leverage afforded by the positioning of the handle 40 at a length above and behind the bicycle. Also, because the bicycle guidance device is attached at the axle bolts, an amount of steering is possible. The handle 40 can be pivotally positioned at any location within the range of motion to suit the preference of the adult.

The invention is capable of taking alternative forms without departing from the spirit of the essential attributes thereof, and accordingly, reference should be had to the following claims, rather than to the foregoing specification, as indicating the scope of the invention.

I claim:

1. A bicycle guidance device for a bicycle having a seat, a seat support, and a rear axle, the device comprising:
    a handle;
    at least one extension for attachment of the handle to the bicycle, said at least one extension being attachable to the bicycle in the vicinity of the rear axle, said extension being dimensioned to position the handle above and behind the seat of the bicycle;
    a pivotal positioning member, operatively and slidably secured to at least one of said extensions, and having structure for pivotal connection to the bicycle in the vicinity of the seat support; and,
    engagement structure for slidably securing said pivotal positioning member to said at least one extension, said engagement structure comprising an engagement member having an aperture adapted to slidably receive said pivotal positioning member through said engagement member, and further comprising structure for securing said pivotal positioning member in a desired position within said engagement member.

2. The bicycle guidance device of claim 1, wherein said at least one extension comprises two extensions, said handle and said extensions forming substantially an inverted U-shaped handle construction.

3. The bicycle guidance device of claim 2, wherein portions of said extensions distal to said handle comprise openings for positioning said extensions on a rear axle bolt of the bicycle, whereby said extensions can be secured by re-securing nuts onto the rear axle bolt.

4. The bicycle guidance device of claim 1, wherein said pivotal positioning member comprises structure for pivotal attachment to a seat adjustment bolt of the bicycle.

5. The bicycle guidance device of claim 1, wherein said engagement member is secured to said at least one extension.

6. A bicycle guidance device for use with a bicycle having a seat, a seat support, and a rear axle, comprising:
- a handle;
- at least two extensions for attachment of the handle to the bicycle, said extensions being attachable to the bicycle in the vicinity of the rear axle, said extensions being dimensioned to position the handle above and behind the seat of the bicycle;
- a support member fixed between at least two of said extensions;
- a pivotal positioning member, operatively and slidably secured to at least one of said extensions, and pivotally connectable to said bicycle in the vicinity of the seat support;
- engagement structure for slidably securing said pivotal positioning member to said at least one of said extensions, said engagement structure comprising an engagement member pivotally mounted to said at least one extension and adapted to slidably receive said pivotal positioning member, and further comprising frictional engagement structure for securing said pivotal positioning member in a desired position, said engagement member further comprising a first channel for receiving said pivotal positioning member, and a second channel for receiving said support member, whereby said engagement member will slide over and pivot about said support member, and further comprising frictional engagement structure for securing said engagement member to said support member at a desired position.

7. The bicycle guidance device of claim 6, wherein said frictional engagement structure comprises a set screw.

8. A method for attaching a bicycle guidance device to a bicycle having a seat, a seat support, and a rear axle, comprising the steps of:
- attaching a handle above and behind the seat of the bicycle by securing at least one extension connected to the handle to the vicinity of the rear axle of the bicycle;
- connecting a pivotal positioning member to the vicinity of the seat support of the bicycle, and slidably engaging the pivotal positioning member to the at least one extension;
- pivotally positioning the handle in the desired position; and,
- securing said pivotal positioning member in place with engagement structure, said engagement structure comprising an engagement member with an aperture adapted to slidably receive said pivotal positioning member through said engagement member, and further comprising structure for securing said pivotal positioning member in a desired position, whereby an adult can grasp the handle in the desired pivotal position to guide and support the child learning to ride the bicycle.

9. A bicycle guidance device for a bicycle having a seat, a seat support, and a rear axle, comprising:
- a substantially inverted U-shaped guidance member having a handle and two elongated extensions for attachment of the handle to the bicycle in the vicinity of the rear axle, the extensions being dimensioned to position the handle above and behind the seat of the bicycle;
- a pivotal positioning member for pivotal connection at one end to the bicycle in the vicinity of the seat support;
- a support member connected between the extensions; and,
- engagement structure for slidably securing the pivotal positioning member, said engagement structure having a first channel for receiving an end of said pivotal positioning member and structure for engaging the pivotal positioning member, and a second channel for slidably receiving the support member.

* * * * *